United States Patent
Allen et al.

(10) Patent No.: US 7,316,525 B2
(45) Date of Patent: Jan. 8, 2008

(54) VORTEX INDUCED VIBRATION OPTIMIZING SYSTEM

(75) Inventors: Donald Wayne Allen, Houston, TX (US); Dean Leroy Henning, Needville, TX (US); Li Lee, Houston, TX (US)

(73) Assignee: Shell Oil Company, Houston, TX (US)

( * ) Notice: Subject to any disclaimer, the term of this patent is extended or adjusted under 35 U.S.C. 154(b) by 26 days.

(21) Appl. No.: 11/326,873

(22) Filed: Jan. 6, 2006

(65) Prior Publication Data

US 2006/0177275 A1    Aug. 10, 2006

Related U.S. Application Data

(60) Provisional application No. 60/642,085, filed on Jan. 7, 2005.

(51) Int. Cl.
*F15D 1/10* (2006.01)
(52) U.S. Cl. .................. 405/211; 405/224; 114/243
(58) Field of Classification Search ............ 405/195.1, 405/211, 224.4; 114/243, 264
See application file for complete search history.

(56) References Cited

U.S. PATENT DOCUMENTS

| | | | |
|---|---|---|---|
| 3,899,991 A | 8/1975 | Chatten et al. | 114/235 |
| 4,398,487 A | 8/1983 | Ortloff et al. | 114/243 |
| 5,410,979 A | 5/1995 | Allen et al. | 114/243 |
| 5,421,413 A | 6/1995 | Allen et al. | 166/335 |
| 5,869,772 A * | 2/1999 | Storer | 73/861.24 |
| 5,875,728 A | 3/1999 | Ayers et al. | 114/264 |
| 6,092,483 A | 7/2000 | Allen et al. | 114/264 |
| 6,179,524 B1 | 1/2001 | Allen et al. | 405/211 |
| 6,196,768 B1 | 3/2001 | Allen et al. | 405/224 |
| 6,223,672 B1 | 5/2001 | Allen et al. | 114/243 |
| 6,227,137 B1 | 5/2001 | Allen et al. | 114/264 |
| 6,263,824 B1 | 7/2001 | Balint et al. | 114/264 |
| 6,309,141 B1 | 10/2001 | Cox et al. | 405/224 |
| 6,551,029 B2 | 4/2003 | Shu et al. | 405/211 |
| 6,561,734 B1 | 5/2003 | Allen et al. | 405/216 |
| 6,565,287 B2 | 5/2003 | McMillan et al. | 405/211.1 |
| 6,571,878 B2 | 6/2003 | Mc Daniel et al. | 166/367 |
| 6,644,894 B2 | 11/2003 | Shu et al. | 405/211 |
| 6,685,394 B1 | 2/2004 | Allen et al. | 405/211 |
| 6,695,539 B2 | 2/2004 | McMillan et al. | 405/191 |
| 6,695,540 B1 | 2/2004 | Taquino | 405/216 |
| 6,702,026 B2 | 3/2004 | Allen et al. | 166/367 |
| 6,886,487 B2 | 5/2005 | Fischer, III | 114/230.1 |
| 6,928,709 B2 | 8/2005 | McMillan et al. | 29/281.1 |
| 6,994,492 B2 | 2/2006 | McMillan et al. | 405/216 |
| 7,017,666 B1 | 3/2006 | Allen et al. | 166/367 |

(Continued)

OTHER PUBLICATIONS

Vortex-Induced Vibration Suppression of Cylindrical Structures by D. W. Allen Apr. 1994.

(Continued)

*Primary Examiner*—Tara L. Mayo
(74) *Attorney, Agent, or Firm*—William E. Hickman (57) ABSTRACT

There is disclosed a system comprising a structure, a vortex induced vibration monitoring system, adapted to monitor a vortex induced vibration level of the structure, a tensioner connected to the structure, and a controller adapted to calculate a tension on the structure to optimize the vortex induced vibration value of the structure.

22 Claims, 5 Drawing Sheets

U.S. PATENT DOCUMENTS

2003/0213113 A1 11/2003 McMillan et al. ......... 29/281.1
2004/0175240 A1 9/2004 McMillan et al. ......... 405/211

OTHER PUBLICATIONS

U.S. Appl. No. 09/625,893, filed Jul. 26, 0000.
U.S. Appl. No. 10/839,781, filed May 4, 2004.
U.S. Appl. No. 10/845,547, filed May 17, 2004.
U.S. Appl. No. 10/848,547, filed May 17, 2004.
U.S. Appl. No. 11/083,383, filed Mar. 18, 2005.
U.S. Appl. No. 60/567,692, filed May 2, 2004.
U.S. Appl. No. 60/664,346, filed Mar. 23, 2005.
U.S. Appl. No. 60/670,160, filed Apr. 11, 2005.
U.S. Appl. No. 60/684,034, filed May 24, 2005.
TH2846 Search Report dated Apr. 18, 2006. Application No. PCT/US2006/000336.
TH2846 Written Opinion dated Apr. 18, 2006. Application No. PCT/US2006/000336.
Vortex-Induced Vibrations Suppression of Cylindrical Structures by D.W. Allen, Apr. 1994.

* cited by examiner

Figure 5
Tension Adjusted Over Time

VORTEX INDUCED VIBRATION OPTIMIZING SYSTEM

CROSS-REFERENCE TO RELATED APPLICATIONS

This application claims priority to U.S. Provisional Application 60/642,085, filed on Jan. 7, 2005. U.S. Provisional Application 60/642,085, is herein incorporated by reference in its entirety.

FIELD OF INVENTION

The present disclosure relates to systems and methods for optimizing the vortex induced vibration of a substantially cylindrical structure in a body of water.

BACKGROUND

U.S. Pat. No. 6,695,540 discloses a vortex induced vibration suppressor and method. The apparatus includes a body that is a flexible member of a polymeric (eg. polyurethane) construction. A plurality of helical vanes on the body extend longitudinally along and helically about the body. A longitudinal slot enables the body to be spread apart for placing the body upon a riser, pipe or pipeline. Adhesive and/or bolted connections optionally enable the body to be secured to the pipe, pipeline or riser. U.S. Pat. No. 6,695,540 is herein incorporated by reference in its entirety.

U.S. Pat. No. 6,561,734 discloses a partial helical strake system and method for suppressing vortex-induced-vibration of a substantially cylindrical marine element, the strake system having a base connected to the cylindrical marine element and an array of helical strakes projecting from the base for about half or less of the circumference of the cylindrical marine element. U.S. Pat. No. 6,561,734 is herein incorporated by reference in its entirety.

U.S. Pat. No. 6,223,672 discloses an ultrashort fairing for suppressing vortex-induced vibration in substantially cylindrical marine elements. The ultrashort falling has a leading edge substantially defined by the circular profile of the marine element for a distance following at least about 270 degrees thereabout and a pair of shaped sides departing from the circular profile of the marine riser and converging at a trailing edge. The ultrashort fairing has dimensions of thickness and chord length such that the chord to thickness ratio is between about 1.20 and 1.10. U.S. Pat. No. 6,223,672 is herein incorporated by reference in its entirety.

Figure 1:
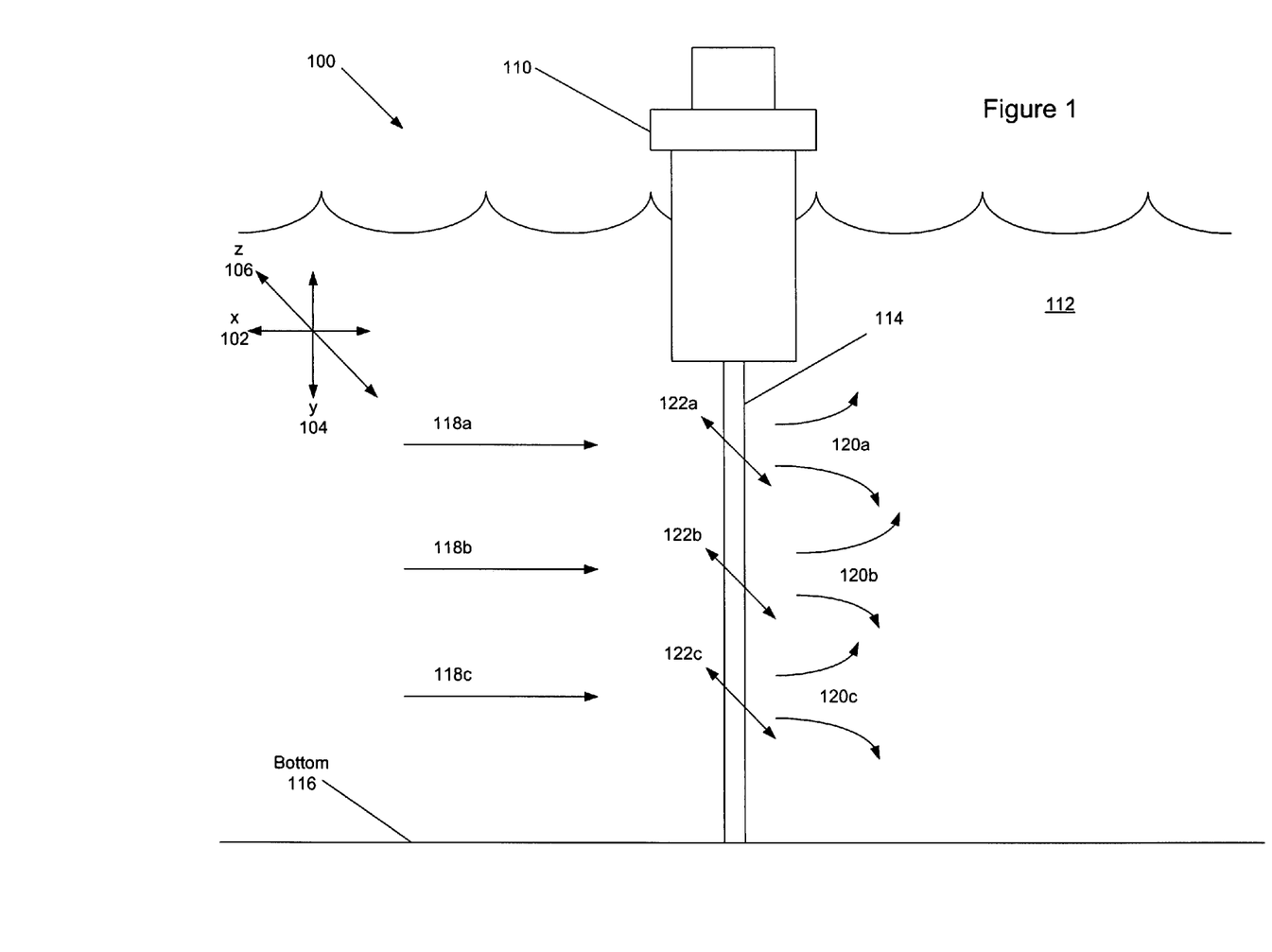
FIG. 1 illustrates a vessel floating in water connected to a cylindrical structure.

Referring to FIG. 1, there is illustrated system 100. X axis 102, Y axis 104, and Z axis 106 are all defined. System 100 includes vessel 110 floating in water 112. Cylindrical structure 114 is connected to vessel 110, and cylindrical structure 114 goes to bottom 116 of water 112. Current 118a, 118b, and 118c are all traveling in the X direction, and encounter cylindrical structure 114. Vortexes 120a, 120b, and 120c are caused by the interaction of currents 118a-118c with cylindrical structure 114. Vortex induced vibrations (VIV) 122a, 122b, and 122c are caused by interaction of currents 118a-118c with cylindrical structure 114.

There is a need in the art for systems and/or methods to optimize VIV of structures exposed to a current or wind.

SUMMARY OF THE INVENTION

One aspect of the invention includes a system comprising a structure, a vortex induced vibration monitoring system, adapted to monitor a vortex induced vibration level of the structure, a tensioner connected to the structure, and a controller adapted to calculate a tension on the structure to optimize the vortex induced vibration value of the structure.

Another aspect of the invention includes a method of controlling vortex induced vibration of a structure in a body of water comprising monitoring a level of vortex induced vibration in the structure, and adjusting the tension in the structure to minimize the level of vortex induced vibration.

Another aspect of the invention includes an apparatus for minimizing vortex induced vibration in a structure comprising a means for calculating the level of vortex induced vibration of the structure, a means for calculating an optimum level of tension in the structure to minimize the vortex induced vibration.

DETAILED DESCRIPTION OF THE INVENTION

Figure 2:
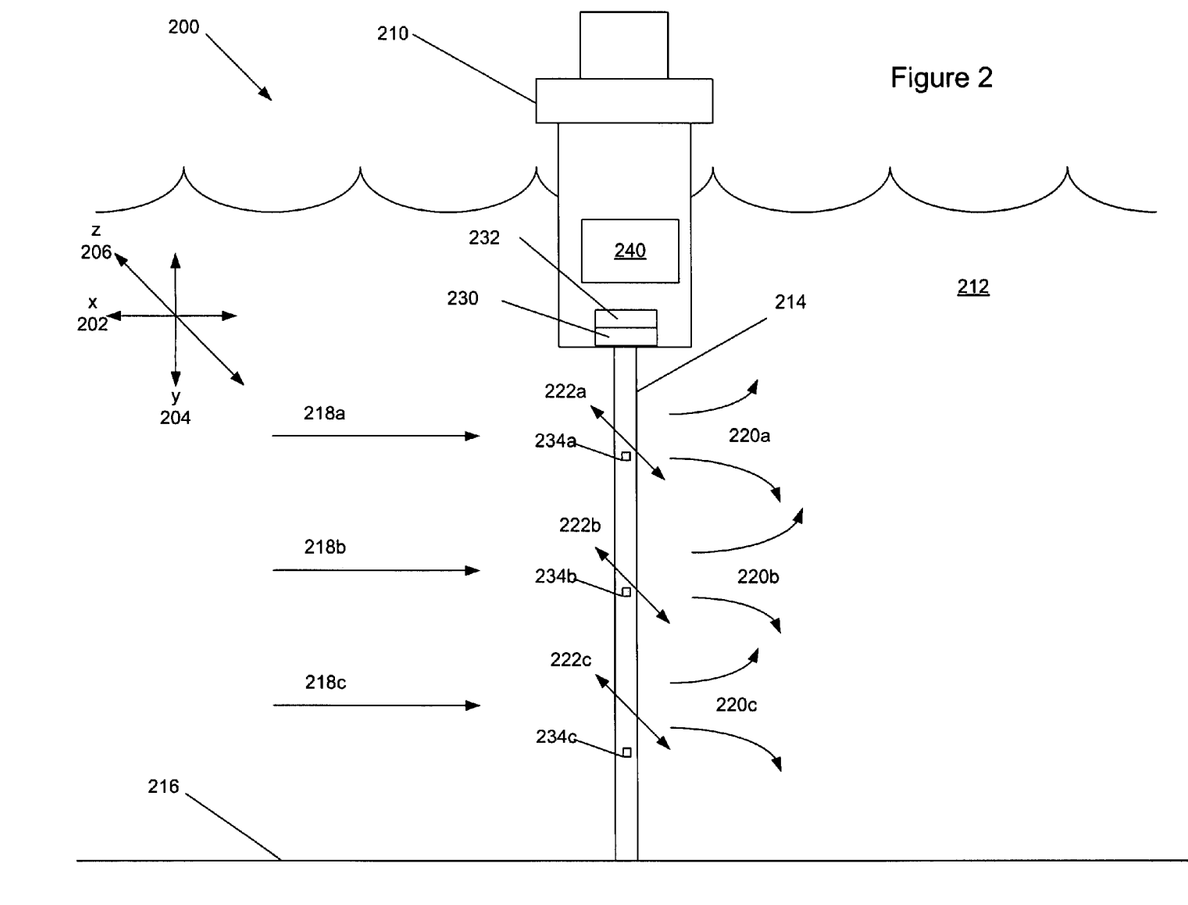
FIG. 2 illustrates a vessel floating in water connected to a cylindrical structure.

Referring now to FIG. 2, in one embodiment of the invention, System 200 is illustrated. X axis 202, Y axis 204, and Z axis 206 are all defined. System 200 includes vessel 210 connected to cylindrical structure 214, and cylindrical structure 214 is connected to bottom 216 of water 212. Currents 218a, 218b, and 218c encounter cylindrical structure 214, causing vortexes 220a, 220b, and 220c, and VIV 222a, 222b, and 222c. Vessel 210 includes tension monitor 230, tensioner 232, and controller 240. Sensors 234a, 234b, and 234c are provided on cylindrical structure 214, which measure VIV and/or current.

Vortex induced vibration (VIV) is defined herein is a vibration having a given displacement and frequency of a structure caused by the vortexes which are caused by an ambient current. The VIV "level" is a function of the displacement and the frequency of the vibrations, with higher displacements and higher frequencies causing higher tensions, stresses, and/or strains, and lower displacements and lower frequencies causing lower tensions, stresses, and/or strains. It is generally desirable to lower the displacement and/or the frequency of VIV in a structure, for example to extend the structure's fatigue life.

In some embodiments, the level of VIV is calculated by averaging the acceleration of the structure over the length of the structure. For example, for a structure having a single accelerometer providing an output of 2 meters per second squared (m/s$^2$), the VIV value would be 2 m/s$^2$. In another example, for a 50 m structure having five accelerometers (every 10 m) providing outputs of 1, 2, 3, 4, and 5 m/s$^2$, the VIV value would be the average of 3 m/s$^2$. In some embodiments, the acceleration can be calculated from an accelerometer. In some embodiments, the acceleration can be calculated from one or more of the bending stress, velocity, displacement, wind or current, and/or dynamic tension.

In some embodiments, the level of VIV is calculated at a given location of the structure, for example at location with high stress concentration factors and/or substandard welds.

For example, for a 50 m structure having five accelerometers (every 10 m) providing outputs of 1, 2, 3, 4, and 5 m/s², the given location with a high stress concentration factor registers the value of 4, so the VIV value would be 4 m/s². This location with the stress concentration factor would be the location to reduce the VIV level.

In some embodiments, the level of VIV is calculated at a given area of the structure, for example at an area that has had more fatigue damage than the rest of the structure, in order to balance the fatigue damage along the length of the structure and improve the overall life of the structure. For example, for a 50 m structure having five accelerometers (every 10 m) providing outputs of 1, 2, 3, 4, and 5 m/s², the given area that has had more fatigue damage registers the value of 2, so the VIV value would be 2 m/s². This area that has had more fatigue damage would be the area to reduce the VIV level.

Figure 3:
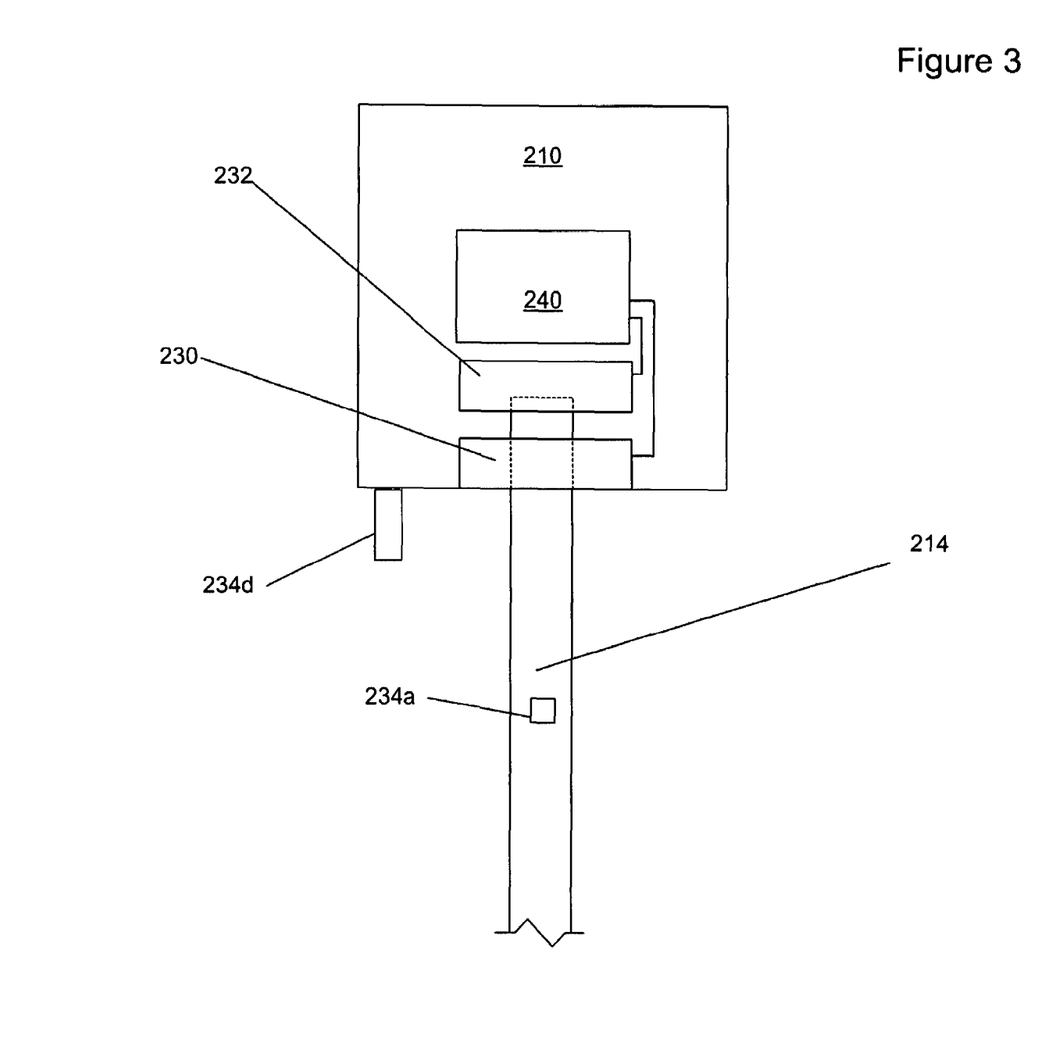
FIG. 3 illustrates a close-up view of the vessel and cylindrical structure of FIG. 2.

Referring now to FIG. 3, a more detailed view of vessel 210 and cylindrical structure 214 is provided. Tension monitor 230 is connected to cylindrical structure, and is adapted to monitor the level of tension on cylindrical structure 214 over time.

Tensioner 232 is also connected to cylindrical structure 214, and is adapted to selectively increase or decrease the tension on cylindrical structure 214. Sensors 234a, 234b, and 234c are provided on cylindrical structure 214, and are adapted to provide a measurement of the movements of cylindrical structure 214 (for example VIV) and/or a measurement of currents 218a, 218b, and 218c. Sensor 234d is adapted to provide a measure of movement of vessel 210, and/or the ambient current. Controller 240 is adapted to receive input from tension monitor 230, sensors 234a-234d, and to provide output to tensioner 232, to selectively increase and/or decrease the tension on cylindrical structure 214, as necessary, to control VIV.

In operation, the VIV is calculated, for example by using sensors 234a-234d, and/or from tension monitor 230. In some embodiments, VIV may be calculated by controller 240 from the movement of sensors 234a-234d relative to a stationary object such as bottom 216 of water 212. In some embodiments, VIV may be estimated by controller 240 from the current measurements of sensors 234a-234d. In some embodiments, a suitable method of calculating VIV from the dynamic tension measurements from tension monitor 230 and/or calculating an optimum tension value to minimize VIV is VIV calculation software commercially available from Shell Oil Company or one of its affiliates of Houston, Tex. Controller 240 then outputs an optimum tension value. In some embodiments, optimum tension value may be sent to tensioner 230 which either increases or decreases tension on cylindrical structure 214. In some embodiments, the tension may be manually adjusted on cylindrical structure 214 based on optimum tension value from controller 240.

Figure 4:
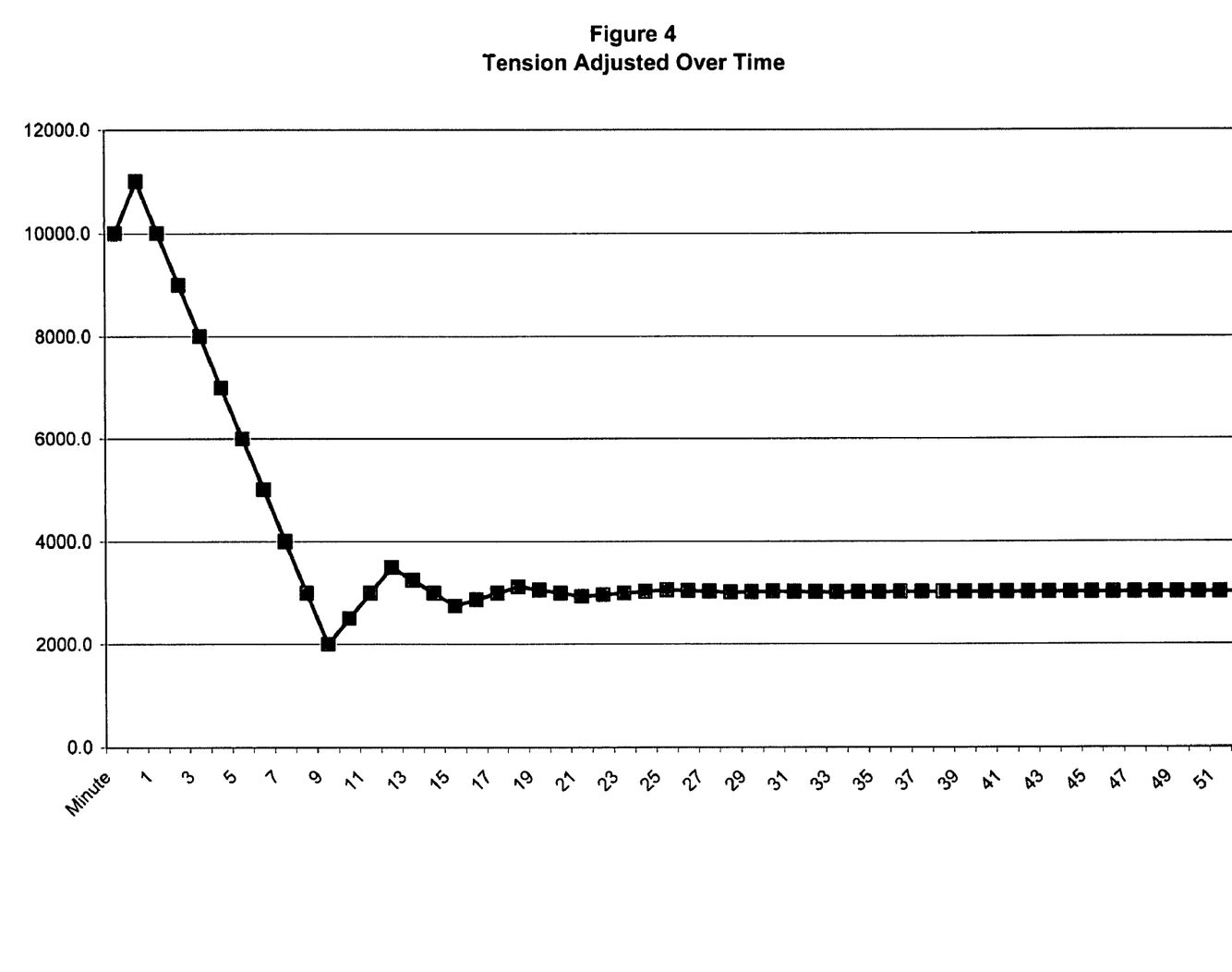
FIG. 4 illustrates an example of tension values over time.

For example, referring to FIG. 4, an optimal tension value for the system 200 is 3025 newtons (N) in order to minimize the VIV on cylindrical structure 214, starting with an initial value of tension of 10,000 N, one suitable algorithm would be to start off adding 1000 N of tension and determining whether the VIV is improved or worsened. In the example illustrated in FIG. 4, since the VIV value is worsened by adding tension from 10,000 to 11,000 N, then controller 240 would adjust the tension by subtracting 1000 N of tension each time cycle until subtracting 1000 N creates a worse value of VIV than the previous cycle's tension value.

In this example, the tension at each cycle would be reduced from 11,000 to 10,000 to 9,000 all the way down to 2,000 N, as the values were consistently improving from 4,000 to 3,000. The VIV value only worsened when moving from 3,000 to 2,000 N. Next, the tensioner would adjust upwards at half the previous value, in this case 500 N, using the same logic until the VIV value is worsened by adding an additional 500 N. In this case, the tension would be adjusted from 2,000 to 2500 to 3000 to 3500, at which point the tensioner would stop adjusting upwards as moving from 3000 to 3500 N worsens the VIV value. The process continues by then subtracting 250 N increments, adding 125 N increments, subtracting 62.5 N increments, adding 31.25 N increments, etc., until the optimal tension value of 3025 N is reached, or the system restarts.

In some embodiments, using this example, the tension adjustments continue until such time as the VIV value (a function of the displacement and frequency, discussed above) changes by at least 2 times the change caused by the previous tension adjustment increment, so that controller 240 restarts and the initial change made is adding 1000 N, and starting the cycle over. This may indicate a change in the subsea environment or other conditions which would require a new optimal tension value to be iterrated. For example, if changing the tension from 3500 to 3250 N changes the VIV value by 2%, and then changing the tension from 3250 to 3000 changes the VIV value by 4%, then the system would reset, and the next change in tension would be to add 1000 N tension to the previous value of 3000.

Figure 5:
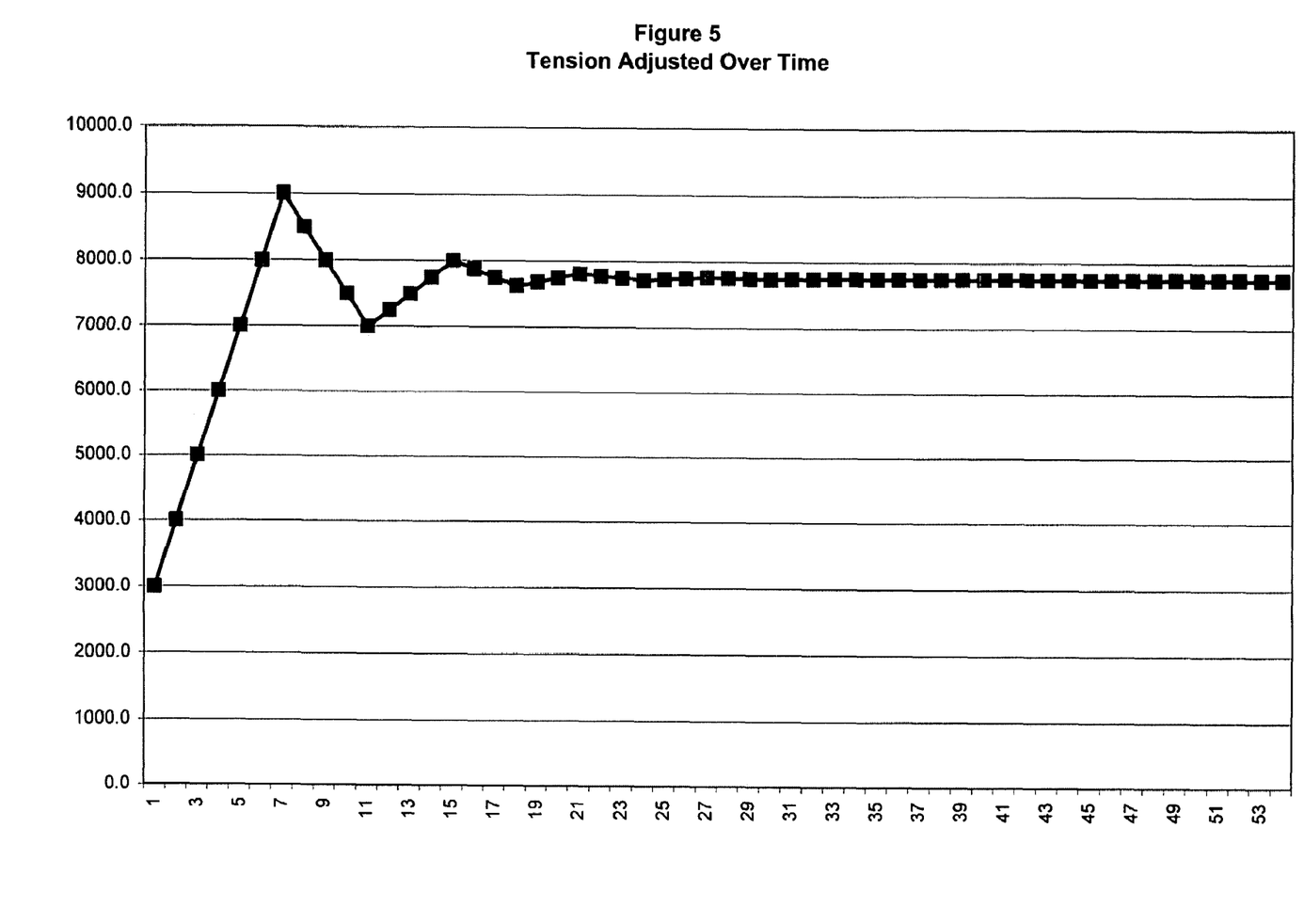
FIG. 5 illustrates an example of tension values over time.

In another example, referring to FIG. 5, an initial tension value is 3000 N, and an optimal tension value is 7750. As before, controller 240 controls tensioner 232 by adding 1000 N of tension at a time, until such time as adding 1000 N of tension worsens rather than improves the VIV value. In this case, tensioner 232 with each cycle moves from 3000 to 4000 to 5000, all the way to 9000 N, as moving from 8000 to 9000 N is the first time that the VIV value worsens by adding 1000 N. Next, 500 N increments are subtracted, here until the tension value reaches 7000 N, as the change from 7500 to 7000 N is the first time that the VIV value was worsened by subtracting 500 N. Next, 250 N increments are added, then 125 N increments are subtracted, then 62.5 N increments added, etc, until the optimal value of 7750 N of tension is reached.

In some embodiments of the invention, the system will reset at such time as the VIV value changes by greater than 2 times the previous incremental change made by adjusting the tension value. This could indicate a change in subsea conditions, such as a change in the currents.

In some embodiments of the invention, the cycle time between increments is set at about 0.5 to 5 minutes, for example at about 1 minute, to allow sufficient time to take VIV measurements, and to allow the change in tension to take effect on cylindrical structure 214.

In some embodiments of the invention, cylindrical structure 214 may change its response modes of vibration due to very small changes in currents 218a-218c. In some embodiments, small changes in tension can cause changes in the response mode of vibration of cylindrical structure 214. These changes in mode may be accompanied by a period of low displacement while cylindrical structure 214 transitions from one mode to another, akin to the vibration stopping and then restarting in a different response mode.

In some embodiments of the invention, active tension control may be used to control/reduce VIV for significant durations to substantially improve the fatigue life of cylindrical structure 214 immersed in currents 218a-218c.

In some embodiments of the invention, cylindrical structure 214 has a natural frequency of $f_n$, where n is the mode number (i.e. $f_1$ is the natural frequency of the first bending mode in a given direction). The natural frequency is controlled by an equation that consists of a tension term as well as a material stiffness term. For a long structure (such as deepwater risers, cables, umbilicals, tendons, etc.), the tension term is usually significantly larger than the material stiffness term, so that changes in the tension significantly affect the natural frequency. In this case, if the change in tension is sufficient, it will cause a change in the response mode number. When the mode number changes the VIV may be temporarily reduced.

In some embodiments of the invention, VIV 222a-222c can be measured by a) measurement of structural motions; b) measurement of dynamic tension; c) measurement of an ocean current thought to produce VIV; or d) a combination of a) through c). Using a), both the frequency and displacement (at least at the measurement points) are known. If only b) is used, then the frequency may be known and the displacements may be inferred from the dynamic tension range. An analytical or computational model of the riser can be used to relate the dynamic tension to the riser displacement, for example, VIV calculation software commercially available from Shell Oil Company or its affiliates.

In some embodiments of the invention, a method for active control of VIV thru tension control includes: (1) Input of the structural motion measurement and/or dynamic tension measurement, for example sampled at a frequency sufficient to approximate the vibration. (2) Conversion of the structural motion measurements or dynamic tension measurements to estimates of vibration amplitude and/or frequency (frequency is not necessary), if the frequency is known, a structural dynamics model of the riser is used to estimate the mode number (optional). Note that a current measurement can also be used to estimate the mode provided an accurate VIV model is used. (3) The required tension is then computed. (4) The tension is then adjusted. Steps 1-4 are repeated as often as deemed necessary or desired.

In some embodiments of the invention, an active control VIV mitigation system 200 includes: (1) a floating or fixed structure 210 for producing hydrocarbons (the offshore platform); (2) one or more long structures/tubulars 214 in tension; (3) a tensioner system 232 for controlling/adjusting the tension of the tubular; (4) a measurement of the tension 230 that is fed electronically into a computer; (5) a computer 240 that determines the required amount of tension adjustment to mitigate the vortex-induced vibration motion of the tubular(s) using a preset automatic algorithm; and (6) a mechanism 240 to feed the required tension adjustment back to the tensioner system 232.

In some embodiments of the invention, structure 214 may have different natural frequencies for different directions of vibration. In some embodiments, vessel 210 will have more than one tubular. In some embodiments, a single computer 240 can compute the required amount of tension adjustment needed for VIV mitigation for multiple tubulars. In some embodiments, a measurement of currents 218a-218c may also be fed into computer 240 to improve system accuracy. In some embodiments, local measurements of tubular strain may also be fed into the computer 240 to improve system accuracy. In some embodiments, tension adjustments are done automatically. In some embodiments, system 200 may have safety precautions in the form of mechanical or electrical hardware that restricts the magnitude and/or rate of the tension adjustments to safe levels.

In some embodiments of the invention, vessel 210 may be a floating oil platform, for example a fixed platform, a tension leg platform, a spar, or a drilling rig.

In some embodiments of the invention, structure 214 may be a mooring line, riser, a tubular, or any other structure subject to current or wind. In some embodiments, structure 214 may have a diameter of about 0.1 to about 5 meters, and a length of about 10 to about 10,000 meters (m). In some embodiments, structure 214 may have a length to diameter ratio of about 100 to about 100,000. In some embodiments, structure 214 may be composed of about 50 to about 300 threaded tubular sections, each with a diameter of about 10 cm to about 60 cm and a length of about 5 m to about 50 m, and a wall thickness of about 0.5 cm to about 5 cm.

In some embodiments of the invention, tension monitor 230 may be a commercially available load cell.

In some embodiments of the invention, tensioner 232 may be a commercially available ram style tensioner.

In some embodiments of the invention, controller 240 may be a commercially available topside computer.

In some embodiments, the VIV level may be minimized by periodically changing the tension by at least about 5%, for example about 10%. For example, a riser system having an acceptable tension range of 80 to 125 kN may start with a tension of 100 kN. In the first time period, the tension can be increased to 115 kN, then in the second time period, decreased to 90 kN, then increased to 110 kN, and then subsequently decreased and increased by at least about 10% in each time period to minimize VIV, for example by changing the mode of the riser. The controller 240 may be programmed to stay within the acceptable range, increase or decrease by a minimum percentage, and make an increase or decrease each time the VIV level increases over a given threshold.

In some embodiments, vessel 210 may have multiple structures 214 attached, for example about 5 to 30, or about 10 to 20. For example, if system 200 has twenty structures attached, vessel 210 has a maximum tension which can be applied to all twenty structures while still maintaining a safe environment. If the maximum tension which can be applied to vessel 210 is 10,000 kN, then the average maximum tension per structure is 500 kN. Controller 240 may be programmed to keep total tension on vessel 210 under 10,000 kN, while minimizing the VIV level on all 20 structures.

In some embodiments of the invention, there is disclosed a system comprising a structure in a body of water, a vortex induced vibration monitoring system, adapted to monitor a vortex induced vibration level of the structure, a tensioner connected to the structure, and a controller adapted to control the tensioner to adjust the tension on the structure to optimize the vortex induced vibration value of the structure. In some embodiments, there is a vessel connected to the structure, where the vessel is floating in the body of water. In some embodiments, the structure is selected from the group consisting of risers and mooring lines. In some embodiments, the vortex induced vibration monitoring system includes a plurality of sensors on the structure. In some embodiments, the vessel includes an oil platform. In some embodiments, the structure includes one or more strakes and/or fairings adapted to lower the vortex induced vibration value of the structure.

In some embodiments of the invention, there is disclosed a method of controlling vortex induced vibration of a structure in a body of water including monitoring a level of vortex induced vibration in the structure, and adjusting the tension in the structure to minimize the level of vortex induced vibration. In some embodiments, the method is an iterative process that continues for a plurality of time cycles. In some embodiments, the structure is selected from risers and mooring lines. In some embodiments, monitoring the vortex induced vibration includes measuring a value from a plurality of sensors on the structure. In some embodiments, the structure includes one or more strakes and/or fairings adapted to lower the vortex induced vibration value of the structure. In some embodiments, the method is an iterative process that continues for time cycles of about 0.5 to about 5 minutes. In some embodiments, the method also includes calculating an optimal tension value for the structure. In some embodiments, calculating an optimal tension value for the structure is an iterative process that continues for time cycles of about 0.5 to about 5 minutes, for example about 1 minute.

In some embodiments of the invention, there is disclosed an apparatus for minimizing vortex induced vibration of a structure, comprising a means for calculating a level of vortex induced vibration in the structure, and a means for calculating a tension in the structure to minimize the level of vortex induced vibration.

In some embodiments of the invention, there is disclosed a system for controlling vortex induced vibration, including a cylindrical structure within a body of water, a means for monitoring the level of vortex induced vibration of the cylindrical structure, a means for optimizing the level of vortex induced vibration of the cylindrical structure. In some embodiments, the cylindrical structure is connected to a vessel is floating in the body of water. In some embodiments, the cylindrical structure is selected from the group consisting of risers and mooring lines. In some embodiments, the means for monitoring the level of vortex induced vibration includes a plurality of sensors on the cylindrical structure. In some embodiments, the means for monitoring the level of vortex induced vibration includes a system for calculating the level of vortex induced vibration from a level of tension of the cylindrical structure. In some embodiments, the cylindrical structure includes one or more strakes or fairings, for example about 10 to about 100, adapted to lower the vortex induced vibration value of the structure. Suitable strakes are disclosed in U.S. Pat. No. 6,561,734, which is herein incorporated by reference in its entirety. Suitable fairings are disclosed in U.S. Pat. No. 6,223,672, which is herein incorporated by reference in its entirety.

In some embodiments of the invention, there is disclosed a system for optimizing vortex induced vibration of a cylindrical structure in a body of water, including a system for measuring and calculating vortex induced vibration values of the cylindrical structure, a tensioner adapted to change the tension on the cylindrical structure, and a controller adapted to change the tension on the cylindrical structure in order to optimize the vortex induced vibration value. In some embodiments, the cylindrical structure is connected to a vessel is floating in the body of water. In some embodiments, the cylindrical structure is selected from the group consisting of risers and mooring lines. In some embodiments, the system for measuring and calculating vortex induced vibration values includes a plurality of sensors on the cylindrical structure. In some embodiments, the system for measuring and calculating vortex induced vibration values includes calculating the level of vortex induced vibration from a level of tension of the cylindrical structure. In some embodiments, the cylindrical structure includes one or more strakes or fairings adapted to lower the vortex induced vibration value of the cylindrical structure.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A system comprising:
   a structure;
   a vortex induced vibration monitoring system, adapted to monitor a vortex induced vibration level of the structure;
   a tensioner connected to the structure; and
   a controller adapted to calculate a tension on the structure to optimize the vortex induced vibration value of the structure.

2. The system of claim 1, further comprising a vessel connected to the structure, wherein the vessel is floating in a body of water.

3. The system of claim 1, wherein the structure is selected from the group consisting of risers and mooring lines.

4. The system of claim 1, wherein the vortex induced vibration monitoring system comprises a plurality of sensors on the structure.

5. The system of claim 1, further comprising a vessel connected to the structure, wherein the vessel comprises an oil platform.

6. The system of claim 1, wherein the structure comprises one or more strakes and/or fairings adapted to lower the vortex induced vibration value of the structure.

7. The system of claim 1, wherein the tensioner is adapted to be manually adjusted.

8. The system of claim 1, wherein the tensioner is adapted to be automatically adjusted based on the tension value calculated by the controller.

9. A method of controlling vortex induced vibration of a structure comprising:
   monitoring a level of vortex induced vibration in the structure; and
   adjusting the tension in the structure to minimize the level of vortex induced vibration.

10. The method of claim 9, wherein the method is an iterative process that continues for a plurality of time cycles.

11. The method of claim 9, wherein the structure is selected from the group consisting of risers and mooring lines.

12. The method of claim 9, wherein monitoring the vortex induced vibration comprises measuring a value from a plurality of sensors on the structure.

13. The method of claim 9, wherein the structure comprises one or more strakes and/or fairings adapted to lower the vortex induced vibration value of the structure.

14. The method of claim 9, wherein the method is an iterative process that continues for time cycles of 0.5 to 5 minutes.

15. The method of claim 9, further comprising calculating an optimal tension value for the structure.

16. The method of claim 15, wherein calculating an optimal tension value for the structure is an iterative process that continues for time cycles of 0.5 to 5 minutes.

17. An apparatus for minimizing vortex induced vibration in a structure, comprising:
   a means for calculating the level of vortex induced vibration of the structure; and
   a means for calculating an optimal level of tension in the structure to minimize the vortex induced vibration.

18. The apparatus of claim 17, wherein the means for calculating the level of vortex induced vibration comprises a plurality of sensors on the structure.

19. The apparatus of claim 17, wherein the means for calculating the level of vortex induced vibration comprises calculating the level of vortex induced vibration from a level of tension of the structure.

20. The apparatus of claim 17, wherein the means for calculating the level of vortex induced vibration comprises calculating the level of vortex induced vibration from a level of current or wind about the structure.

21. The apparatus of claim 17, further comprising a tensioner means adapted to apply the optimal level of tension.

22. The apparatus of claim 17, wherein the means for calculating the level of vortex induced vibration and the means for calculating an optimal level of tension are adapted to iteratively calculate every 0.5 to 5 minutes.

* * * * *